United States Patent [19]

Snyder, Jr.

[11] Patent Number: 4,480,912
[45] Date of Patent: Nov. 6, 1984

[54] TRANSDUCER ALIGNMENT METHOD FOR WEIGHT AND BALANCE SYSTEM

[75] Inventor: John D. Snyder, Jr., Bellevue, Wash.
[73] Assignee: Sundstrand Data Control, Inc., Redmond, Wash.
[21] Appl. No.: 351,960
[22] Filed: Feb. 24, 1982
[51] Int. Cl.³ .............................................. G01B 11/27
[52] U.S. Cl. ................................... 356/138; 364/559; 356/153
[58] Field of Search ................ 364/463, 559; 356/138, 356/153, 154, 155, 152; 33/288; 73/802; 177/50, 128

[56] References Cited

U.S. PATENT DOCUMENTS

4,311,386 1/1982 Coetsier ............................. 356/155
4,312,042 1/1982 Bateman ............................. 364/463

Primary Examiner—Errol A. Krass
Assistant Examiner—Edward R. Cosimano
Attorney, Agent, or Firm—Wood, Dalton, Phillips, Mason & Rowe

[57] ABSTRACT

A method of determining the alignment of a first transducer mounting surface relative to a second transducer mounting surface includes utilizing a laser in conjunction with first and second precision ground fixtures secured to the first and second transducer mounting surfaces, respectively. An optically flat mirror is carried by each of the fixtures, with the mirror of the first fixture being partially light-transmissive. The incident light beam from the laser is directed at the partially light-transmissive mirror which, in turn, reflects part of the incident beam to form a first reflected beam. The remaining portion of the incident beam is transmitted and is reflected by the other mirror to form a second reflected beam. The two beams reflected by the mirrors are projected upon a screen disposed in front of the laser, such screen having an aperture through which the incident beam passes. The position of the laser and screen is adjusted so that the reflected beam from one of the mirrors falls at a predetermined location on the screen. The horizontal and vertical distances on the screen of the reflected beams from the incident beam are measured and are used in an equation to determine the angular alignment of the transducer mounting surfaces relative to one another.

10 Claims, 27 Drawing Figures

TRANSDUCER ALIGNMENT METHOD FOR WEIGHT AND BALANCE SYSTEM

BACKGROUND OF THE INVENTION

This invention relates to a method of measuring the alignment of one surface relative to another and, more particularly, to a method for determining the angular alignment of transducer mounting surfaces relative to one another.

It is necessary for a pilot of an aircraft to determine whether the aircraft's weight and balance are within the safe operating limits or boundaries of the aircraft. A system for providing such an indication to the pilot is disclosed in U.S. Pat. No. 4,312,042, assigned to the assignee of this application. This system utilizes two or more inclinometers to measure the bend in a structural member, such as a landing gear element, a wing, or a fuselage section, due to the loading of the aircraft. Typically, an inclinometer is mounted at each end of the structural member on transducer mounting surfaces which are fixed within or to the structural member.

However, if the transducer mounting surfaces are misaligned, i.e. out of parallel, with respect to each other, in turn causing a misalignment of the transducers mounted on the structural member, then rotations of the structural member about its longitudinal axis will cause second order angle effects which will be sensed by the transducers. These angle effects typically cause weight errors in the system and hence a false indication of aircraft loading and/or balance.

In the past, the transducer mounting surfaces were initially installed in or on the structural member by sight approximation to align the transducer surfaces. Typically, this alignment resulted in angular errors of the placement of one transducer mounting surface relative to another of up to ±3.5°, resulting in the above-noted degradation of the accuracy of the weight and balance system.

The problem of physically measuring the alignment of the mounting surfaces relative to one another becomes evident when one considers the physical surroundings and what the accuracy requirements are of measuring the surfaces for parallelism. One problem is that the two transducer mounting surfaces may be up to approximately 80 inches apart in some aircraft and facing in opposite directions. Another problem is that a structural member itself is often located between the two surfaces, further compounding the difficulty of accomplishing the desired result.

Typically, the mounting surfaces for the transducers must be aligned with respect to one another within a very close range, typically ±0.1° in the horizontal plane, in order to reduce weight errors to an insignificant degree. This requirement is equivalent to measuring a linear distance of approximately 0.0041" from 80" away, and with the obstacles present as noted above.

One proposed solution is to use a precision surveying type transit scope and mirrors. However, this has proved to be impractical since the human eye is not able to accurately distinguish the resolution required at 80", even with the magnification of a precision scope.

SUMMARY OF THE INVENTION

In accordance with the present invention, the above noted disadvantages are overcome by utilizing a method which employs optical techniques, including the use of a straight-line light source or laser.

The measurement of, i.e. the degree of parallelism, of a first transducer mounting surface relative to a second mounting surface is accomplished by utilizing precision ground fixtures which are secured to the respective transducer mounting surfaces, with each fixture having an optically flat mirror secured over an aperture of the fixture. The mirror of the first fixture is partially reflective and partially transmissive to light. The incident light beam from the laser is directed toward the partially light-transmissive mirror, which reflects a portion of the incident beam to form a first reflected beam which is projected upon a screen and which allows the remaining portion of the incident beam to strike the other mirror. The remaining portion of the incident beam is reflected by the other mirror to form a second reflected beam which is also projected upon the screen.

The position of the laser and screen is adjusted so that the second reflected beam is located at a predetermined location on the screen. The horizontal and vertical distances of the reflected beams from the incident beams are measured and used in an equation to determine the horizontal and vertical misalignment of the transducer mounting surfaces.

DESCRIPTION OF THE PREFERRED EMBODIMENT

Figure 1:
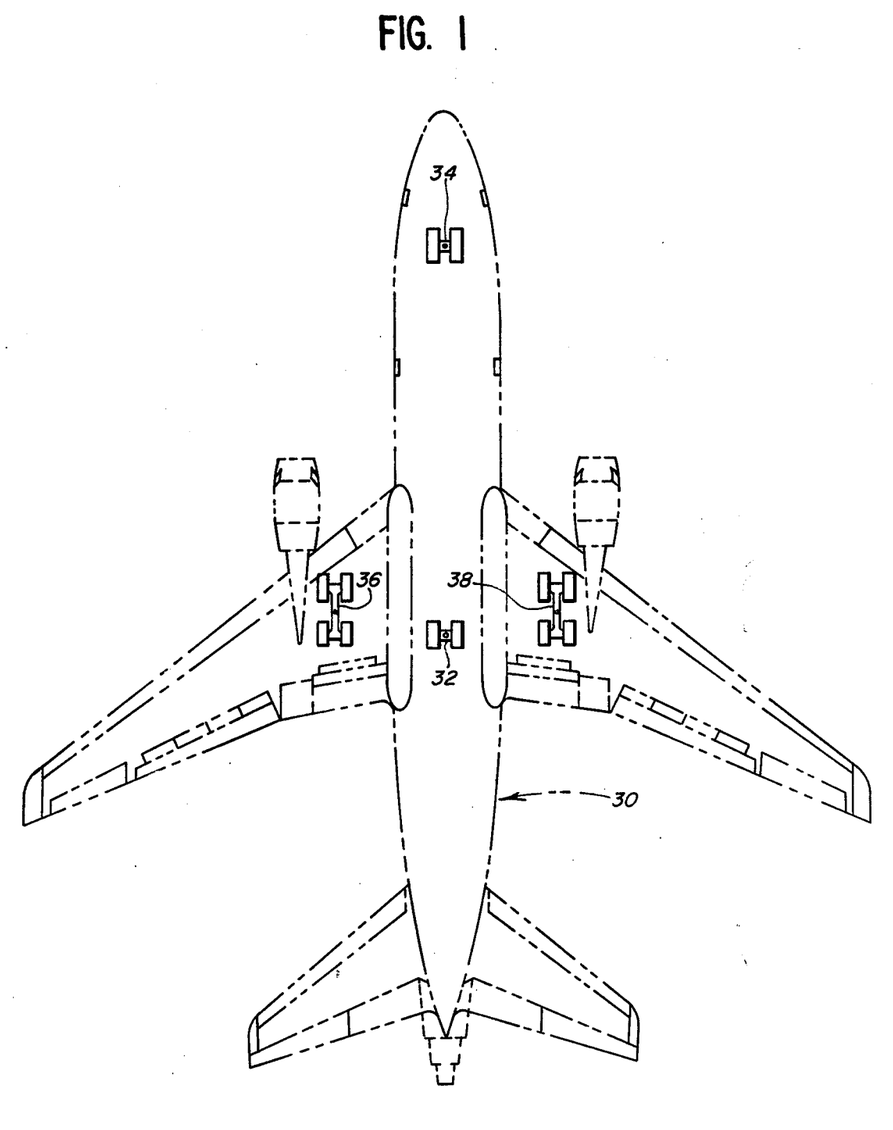
FIG. 1 is a plan view partially in phantom of an aircraft utilizing a weight and balance detection system for determining the weight of the aircraft.

Referring now to FIG. 1, there is illustrated an aircraft 30 having a landing gear generally consisting of a centerline gear 32, a nose gear 34 and left and right main gear 36, 38 respectively. For example, the aircraft 30 may be a DC-10 aircraft manufactured by Mc-Donnell-Douglas Corporation. The aircraft 30 incorporates a weight and balance system of the type shown in Bateman, U.S. Pat. No. 4,312,042, entitled "Weight, Balance and Tire Pressure Detection System" and assigned to the assignee of this application, the disclosure of which is hereby incorporated by reference.

The weight and balance system noted above utilizes inclinometers positioned to measure the angle of bending in a structural member, such as a bogie beam, axle, or other weight-supporting structure, to determine the weight of the aircraft.

It is important for proper operation of the weight and balance system that the inclinometer on each weight supporting member have their sensitive axes arranged parallel to one another to within a small angle range in order to minimize errors caused by second order angle effects. It has been found that the largest amount of errors in introduced by misalignment of the inclinometer disposed on the bogie beam of the main gear 36, 38, although other errors will develop to a lesser extent by misalignment of the inclinometers on the nose gear and centerline gear 32, 34.

As will be described later in more detail with respect to FIG. 17, the inclinometer for use with the main gear 36, 38 are mounted on transducer mounting surfaces 222, 223 disposed on a bogie beam 200. The sensitive axes of the inclinometer are aligned in parallel relationship by accurately positioning the transducer mounting surface 222 relative to the transducer mounting surface 223.

Figure 5:
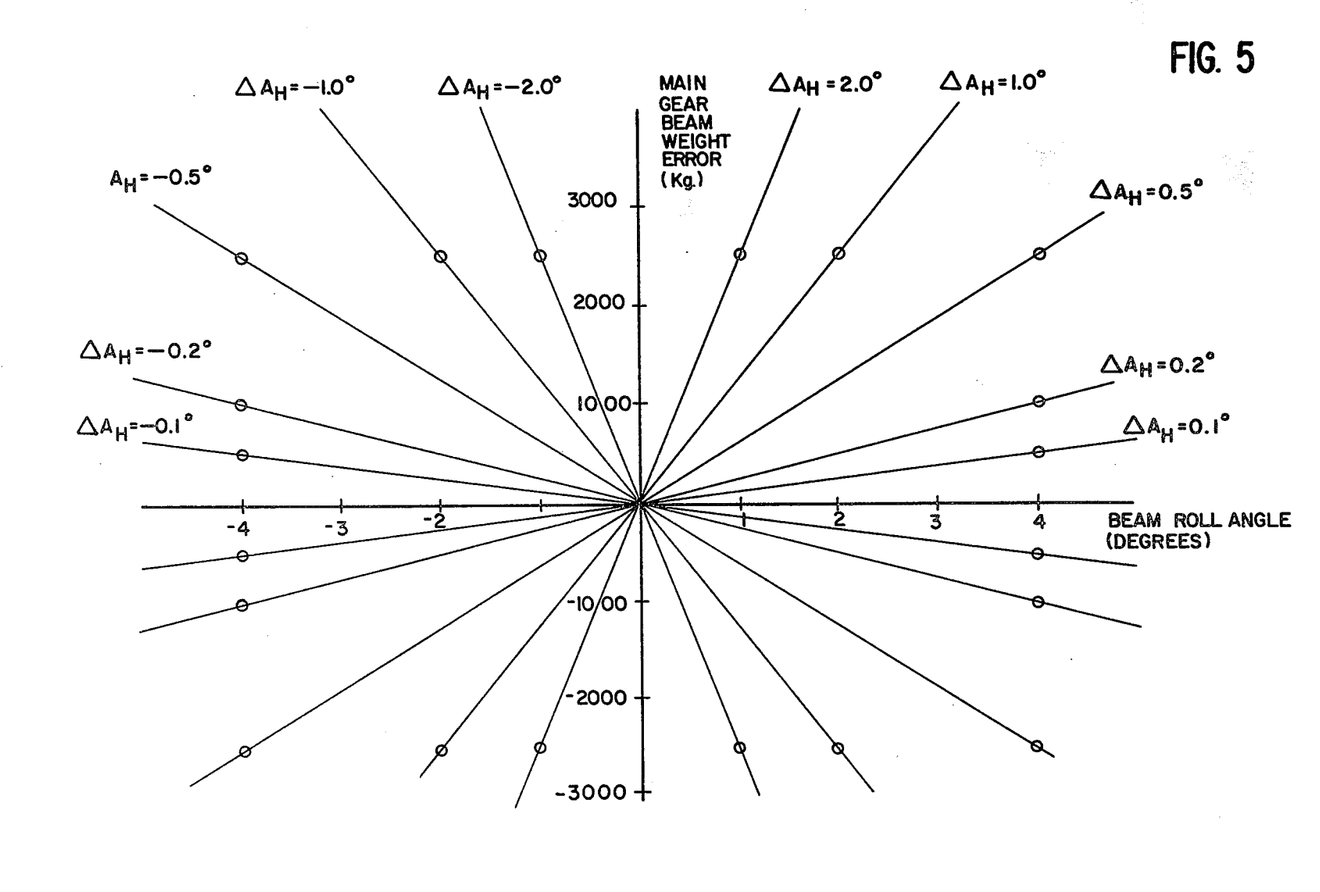
FIGS. 5 and 5A are graphs representing the main landing gear bogie beam weight error as a function of beam roll angle and beam pitch angle, respectively, for various values of misalignment of the transducer mounting surfaces.
Figure 5A:
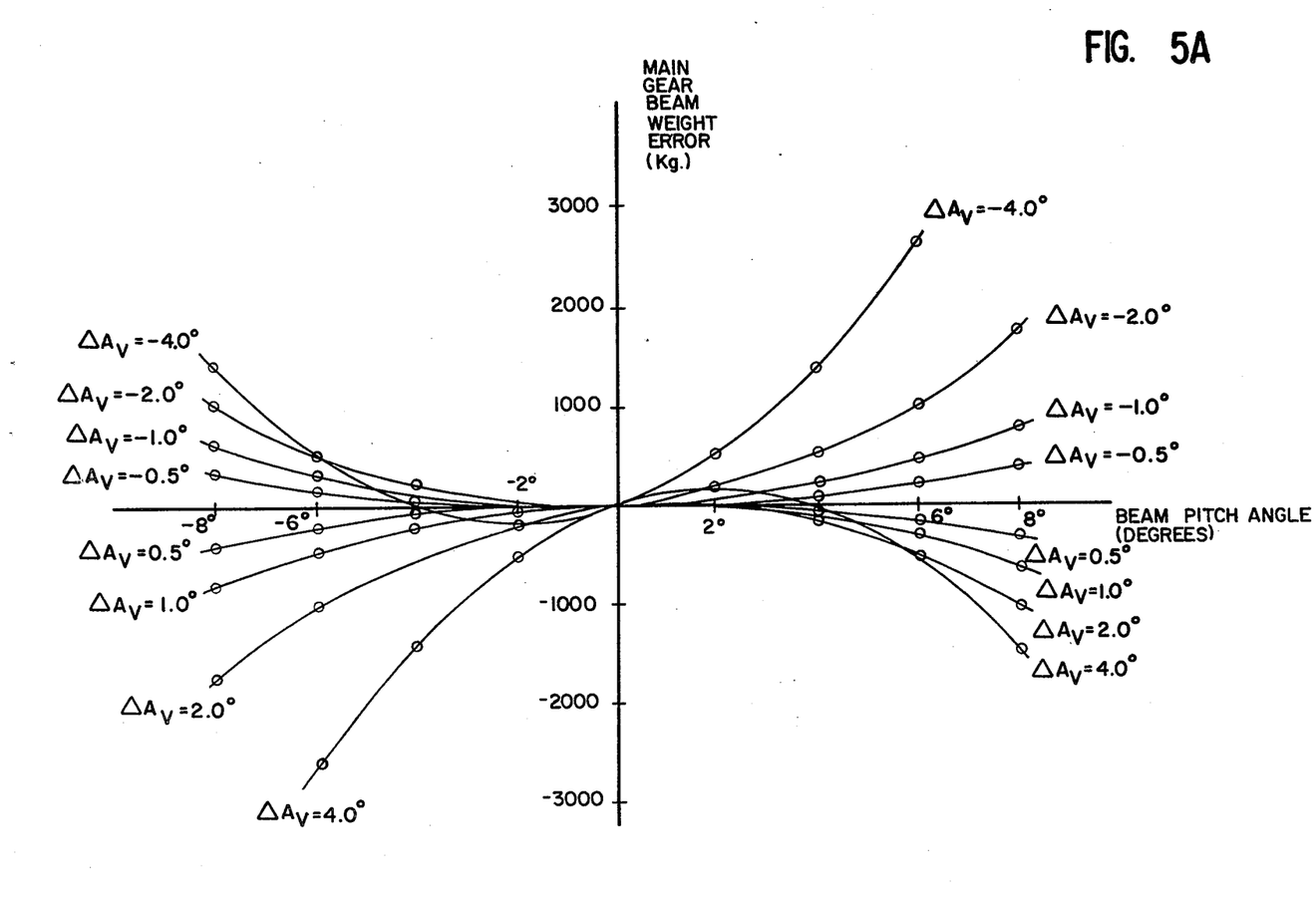

The necessity for aligning the mounting pads 222, 223 to within a small angular range is graphically illustrated in FIGS. 5 and 5A. For example, as shown in FIG. 5, if a horizontal angular difference $\Delta A_H$ exists between the mounting surface 222 and the mounting surface 223 equal to $\pm 1.0°$, then for two degrees of roll angle of the main gear bogie beam housing 200, the weight indicated by the system will be in error by as much as 2500 kg. Such a large degree of error is unacceptable and, hence, the allowable range of horizontal angular misalignment between the surfaces 222, 223 must be made as small as possible, with $\pm 0.1°$ being a satisfactory range to reduce errors to an insignificant degree.

As shown in FIG. 5A, the vertical alignment of the transducer mounting surfaces 222, 223 relative to one another is also important to minimize weight errors occurring as a function of bogie beam pitch angle, although to a lesser extent than horizontal misalignment. For example, for a bogie beam pitch angle of 6° and a vertical misalignment of $-4°$ of the transducer pads 222 with respect to the transducer mounting pads 223, approximately 2500-2700 kg of error will be indicated by the weight and balance system. Generally, it has been found that if vertical misalignment between the mounting pads 222, 223 is held to within $\pm 0.5°$, then no significant errors will be introduced by variations in beam pitch angle.

As previously noted, minimal errors are also introduced by misalignment of the inclinometers disposed on the nose gear and centerline gear 32, 34 and hence each of the gears 32, 34, 36, and 38 will be described individually below.

Figure 2:
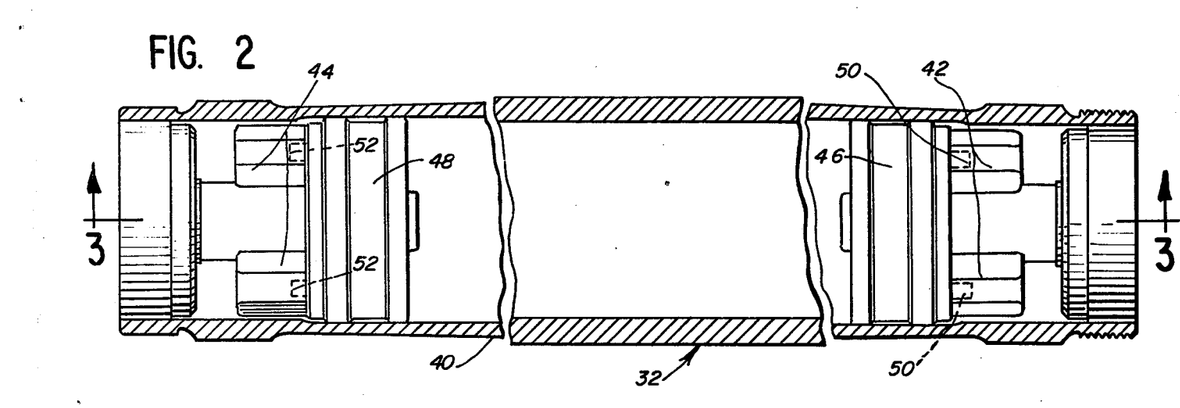
FIG. 2 is a broken partial sectional view from above of a centerline axle gear for the aircraft shown in FIG. 1.
Figures 3, 4:
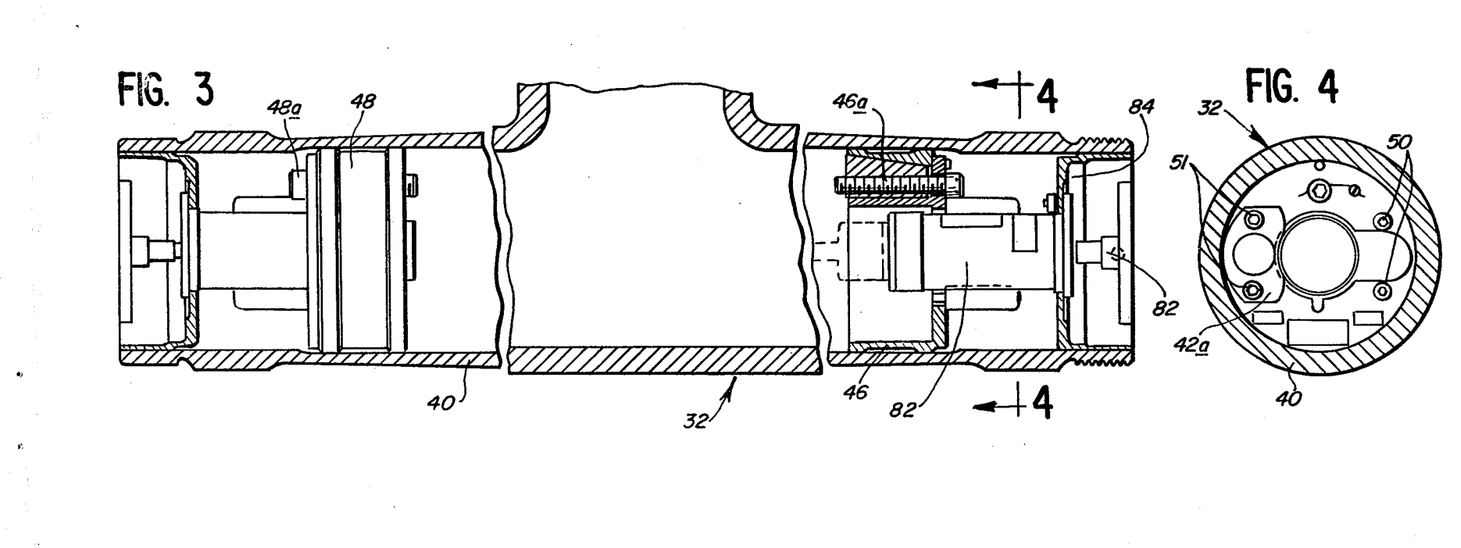
FIG. 3 is a broken partial sectional view, taken generally along the lines 3—3 of FIG. 2.
FIG. 4 is a sectional view, taken along line 4—4 of FIG. 3, with one transducer removed to reveal the transducer mounting surfaces thereunder.

Referring now to FIGS. 2-4, there is illustrated in detail the centerline gear 32 of the aircraft 30, in conjunction with a portion of the weight and balance system.

The centerline gear 32 inches includes an axle housing 40 within which are mounted first and second pairs of inclinometers 42, 44, respectively, in the form of servoed-accelerometers. The first and second pair of inclinometers 42, 44 are fixed within the axle housing 40 by means of supporting structures 46, 48 which include pressure-adjusting apparatus 46a, 48a used to secure the position of the pairs of inclinometers within the housing 40.

The supporting structures 46, 48 also include transducer mounting surfaces or pads 50, 52, respectively, of which only the right pair of the pads 50 are visible in FIG. 4. The transducer pairs are secured to the pads by bolts 51, illustrated in conjunction with one of the transducers 42a in FIG. 4.

Figures 6, 7, 8, 9:
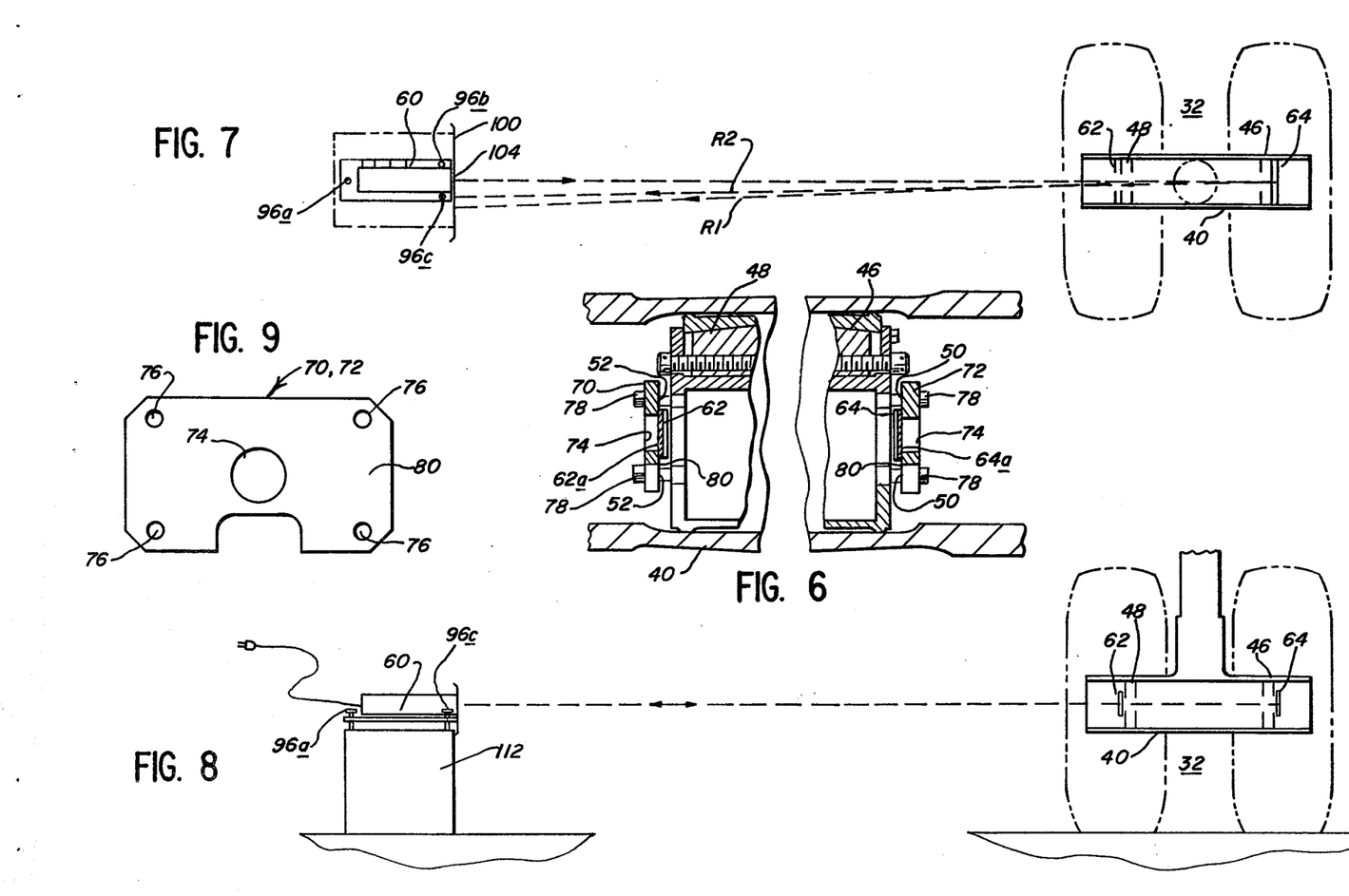
FIG. 6 is a view, similar to FIG. 3, showing the apparatus used in performing the method of the present invention.
FIGS. 7 and 8 are plan and elevational schematic views, respectively, of apparatus (typical for both nose and centerline gear axles), for carrying out the method of the present invention.
FIG. 9 is an elevational view of a fixture for use in a centerline gear.

Referring now to FIGS. 6-8, the measurement of alignment of the transducer mounting pads will be described with particular reference to the centerline gear 32.

The measurement of alignment of the transducer mounting pads 50 relative to the transducer mounting pads 52 is performed by removing the transducer pairs 42, 42 and by utilizing a straight line light source, or laser 60, in conjunction with first and second mirrors 62, 64 which are secured to fixtures 70, 72 mounted on the mounting pads 52, 50, respectively.

Referring also to FIG. 9, the fixtures 70, 72 are identical and include and aperture 74 and mounting holes 76. Socket head screws 78, FIG. 6, extend through the mounting holes 76 and are threadably engaged by the mounting pads 50, 52. The socket head screws 78 are tightened to a torque setting identical to that specified for mounting the transducers on the mounting pads, typically 95±5 inch-lbs.

The fixtures 70, 72 each include a ground face 80 which abuts the mounting pads 50 or 52 and which is flat to within 0.0003".

The mirror 62 includes a coated surface 62a whose surfaces are parallel to within close tolerances, such as 20 seconds of arc, and are flat to approximately 10 wavelengths of the characteristic light emitted by the laser 60. The coated surface 62a is partially transmissive and partially reflective, e.g., its transmittance of light may be 70% and its reflectance may be 30%. The coated surface 62a is secured by means of glue pads or other bonding agent directly to the ground surface 80 of the fixture 70, such that it is centered over the aperture 74.

The front surface mirror 64 is optically flat, e.g., to within ¼ wavelength of the characteristic light emitted by the laser 60, and includes a coated surface 64a. The rear mirror surface is secured to the ground face 80 of the fixture 72 by glue pads or other bonding agent.

Care should be taken to clean the surfaces of the mounting pads 50, 52 and the ground faces 80 of the fixtures 70, 72 before installation to eliminate the possibility of erroneous measurements resulting from the presence of debris between the respective surfaces.

Figure 10:
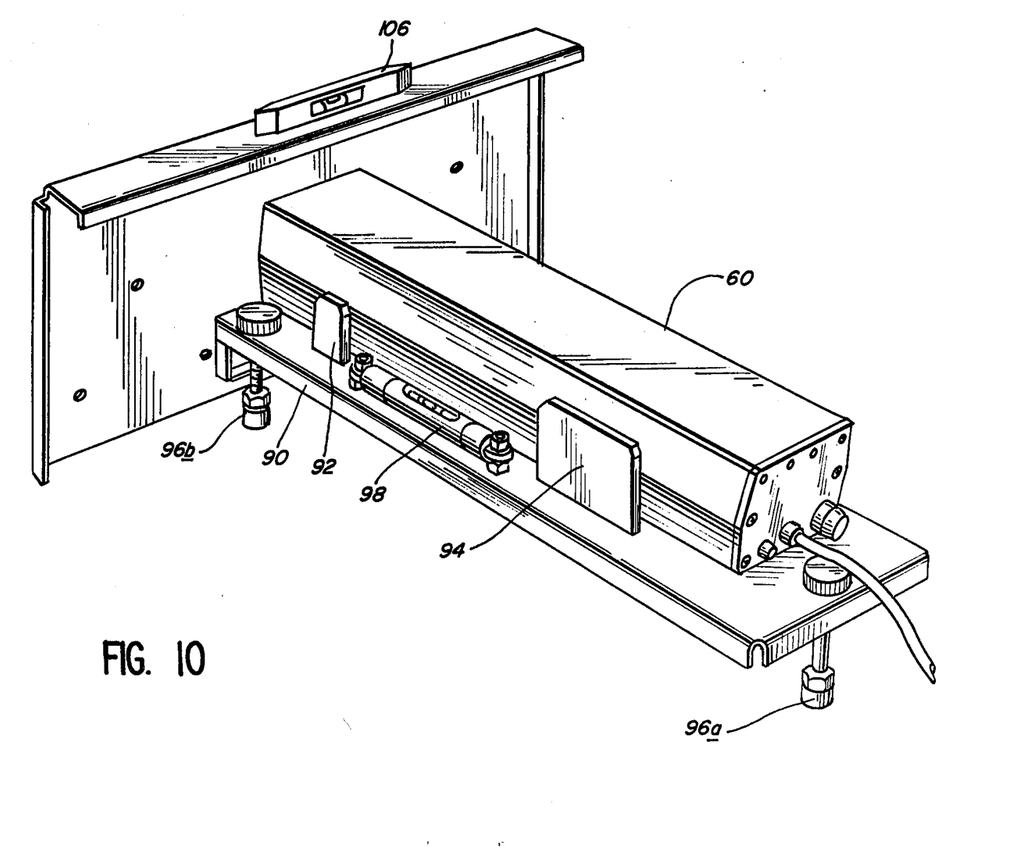
FIG. 10 is a perspective view of the laser and screen.
Figure 11:
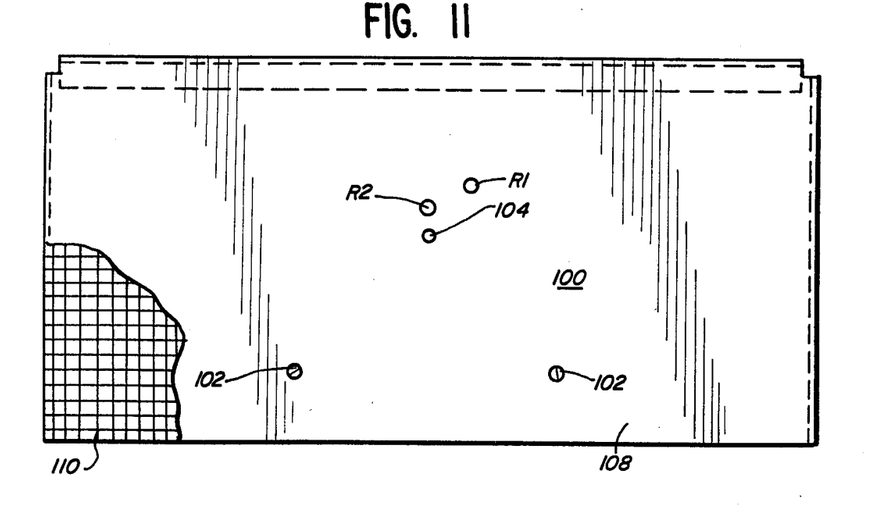
FIG. 11 is an elevational view, partially in phantom, of the screen.

Referring now to FIGS. 10 and 11, the laser 60 is a low power helium-neon type, commonly used as an educational tool in schools and for construction and laboratory alignment procedures.

The laser 60, for example, may be a Class II, 0.50 milowatt laser which emits a visible red beam approximately 1 mm in diameter. The laser may be of the type manufactured by Spectra-Physics, of Mountain View, Calif. under part No. 155.

As seen in FIG. 10, the laser 60 is mounted on a base 90 by means of brackets 92, 94. The base height is adjustable by means of three screw-type adjustable feet 96a, 96b, visible in FIG. 10 and 96c visible in FIGS. 7 and 8.

A bubble level 98 is secured to the base 90 and is used to level the laser 60 from front to back, i.e., from the adjustable feet 96b, 96c to the adjustable foot 96a.

A screen 100 is secured to the base 90 by a pair of screws 102, shown in FIG. 11. The screen 100 includes an aperture 104 through which the light beam from the laser 60 passes. Disposed atop the screen 100 is a second bubble level 106, FIG. 10, which is used to check the inclination of the base 90 and laser 60 from left to right, i.e., from the adjustable foot 96b to the adjustable foot 96c.

Secured to a front face 108 of the screen 100 may be a piece of graph paper 110, of which only a portion is shown in FIG. 11, which may be used as an aid during the measurement procedure.

The first step in the alignment measuring procedure is to remove all obstacles which may obstruct a line-of-sight within the axle housing 40, such as a wheel speed transducer 82, FIG. 3, and mounting assembly 84. Next, it is necessary to initially align the laser 60 relative to the mirrors 62, 64 (FIGS. 6, 7, 8). This is accomplished by measuring the vertical height from the approximate center of the apertures 74 and mirrors 62, 64, and locating the aperture 104 of the screen 100 at the same approximate height by means of a stand 112 shown in FIG. 8. The laser is positioned so that the mirror 62 is located between the laser 60 and the mirror 64.

Furthermore, it is necessary to position the laser 60 at an appropriate distance from the mirrors 62, 64 to insure a sensitive measurement of alignment. Generally, it has been found that the farther the laser 60 is away from the mirrors 62, 64, the more sensitive measurement can be obtained. However, at very great distances between the laser 60 and the mirrors 62, 64, the laser beam tends to diverge and less sensitive readings result. Consequently, a balance must be struck between these two competing considerations. It has been found that a distance of approximately 96" between the front face 108 of the screen 100 to the mirror 62 results in an acceptable degree of sensitivity of the alignment measurement.

The next step in the procedure is to energize the laser by coupling it to an appropriate source of power and directing the laser beam onto the center of the mirror 62. The mirror 62 allows a portion of the incident beam to pass therethrough and onto the mirror 64. As shown in FIG. 7, there will be two reflected beams R1 and R2 resulting from the reflection of the incidental beam by the mirrors 62, 64, respectively.

The laser 60 and screen 100 are then moved horizontally so that the reflected beam R2 from the mirror 64 is located on the screen 100 on a vertical line passing through the aperture 104. The laser height is then adjusted by using the adjustable feet 96 so that the reflected beam R2 is projected on the screen just slightly above the aperture 104 on the vertical line, as shown in FIG. 11.

Typically, the reflected beam R2 may be located approximately 0.3" above the incidental beam. To facilitate this centering, the graph paper 110 may be used and the intersection of a horizontal and a vertical line on the graph paper may be located at this point. The stand 112 and/or the adjustable feet 96 may then be adjusted to position the beam R2 on this intersection. In addition, the bubble levels 98, 106 should indicate that the screen and laser are level.

The next step in the procedure is to record measurements as follows:

$b_H$ = horizontal distance on screen of R1 from the incident beam (i.e., the center of aperture 104);

$b_v$ = vertical distance on screen of R1 from incident beam;

$a_v$ = vertical distance on screen of R2 from incident beam (nominally 0.30 inch);

B = distance from front face 108 of screen 100 to the coated surface 62a of mirror 62;

A = distance from front face 108 of screen 100 to the coated surface 64a of mirror 64 (which equals "B" + distance between the coated surfaces 62a, 64a).

Once these quantities are measured, the angular alignment between the mounting surfaces 50, 52 may be computed as follows:

$$\text{Horizontal (Azimuthal) Angular Alignment} = \tfrac{1}{2} \text{Arc Tan} \frac{b_H}{B}$$

$$\text{Vertical Angular Alignment} = \overset{(1)}{\tfrac{1}{2} \text{Arc Tan} \frac{a_v}{A}} \pm \overset{(2)}{\tfrac{1}{2} \text{Arc Tan} \frac{b_v}{B}}$$

In the equation to determine the vertical angular alignment, the terms (1) and (2) are added if the reflected beam R1 is located below the reflected beam R2 on the screen 100. Conversely, the term (2) is subtracted from the term (1) if the reflected beam R1 is located above the reflected beam R2 on the screen 100.

As previously noted, the horizontal angular alignment should generally be within ±0.10° and the vertical angular alignment should be within ±0.5°. If it is found that either the horizontal or vertical angular alignment is outside the required ranges, it is necessary to adjust the positioning of the mounting surfaces 50, 52 by adjusting the positioning of either or both of the supporting structures 46, 48.

Once it has been determined that the angular alignment is within the required ranges, the fixtures 70, 72 are removed from the mounting pads 50, 52 and the transducers and other components located within the housing 40 are replaced.

The alignment measurement procedure for the nose gear 34 is generally identical to that previously described in connection with the centerline gear, with the primary difference being the shape of the fixtures used to support the mirrors 62, 64.

Figure 12:
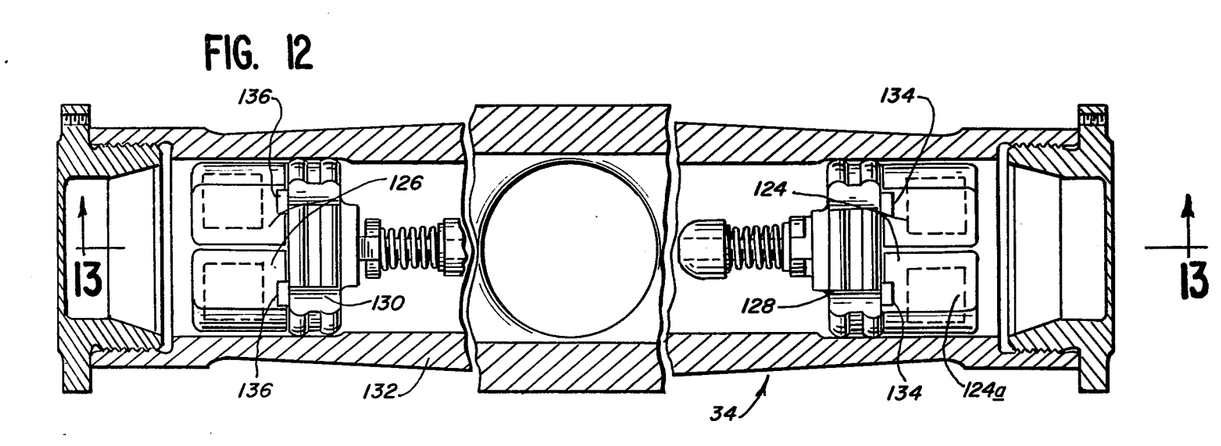
FIGS. 12-14 are views, similar to FIGS. 2-4, respectively, of a nose gear axle for the aircraft shown in FIG. 1.
Figure 13:
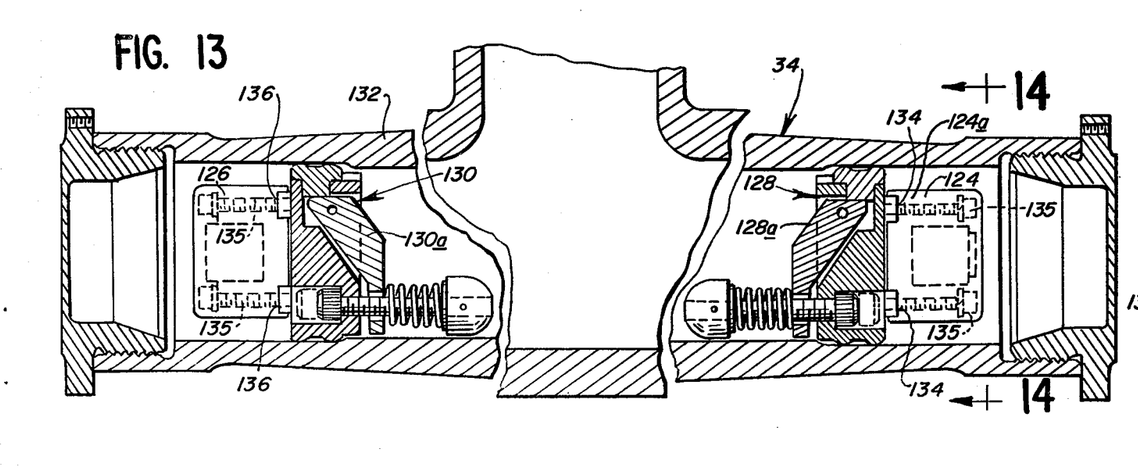
Figure 14:
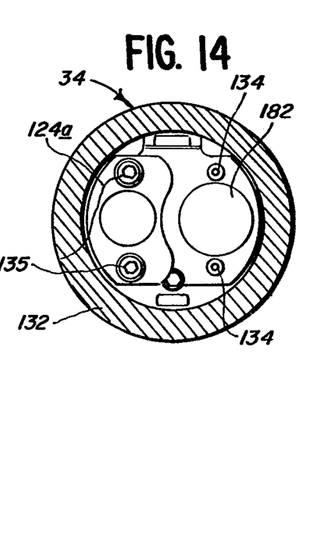

The nose gear 34, shown in FIGS. 12-14, has two pairs of transducers 124, 126 disposed on transducer supporting structures 128, 130 respectively. The supporting structures 128, 130 are disposed within a nose gear axle housing 132 which is a part of the nose gear 34.

The supporting structure 128 includes transducer mounting pads 134 (of which only the right pair are visible in FIG. 14) to which the transducers 124 are secured by means of bolts 135, as illustrated by one transducer 124a of the pair of transducers 124. Similar mounting pads 136 are disposed on the supporting structure 130.

Figure 15:
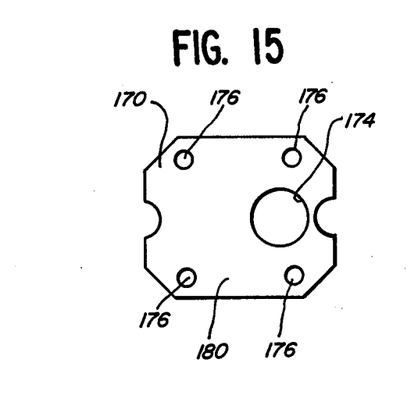
FIG. 15 is an elevational view of a further type of fixture for use in a nose gear axle.
Figure 16:
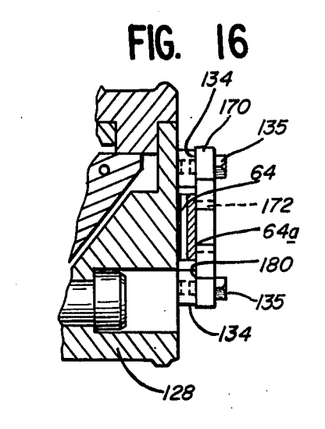
FIG. 16 is an enlarged view, partially in section, of a portion of the supporting structure shown in FIG. 13 with a fixture and mirror secured thereto.

Referring also to FIGS. 15 and 16, a nose gear fixture 170 includes an aperture 174 and mounting holes 176 similar to the aperture 74 and mounting holes 76 described with respect to the fixtures 70, 72.

The fixture 170 also includes a ground face 180 similar to the ground face 80 described with respect to the fixtures 70, 72. One of the mirrors 62, 64 are secured to this ground face 180, as noted previously and as shown in FIG. 16.

The measurement procedure is identical to that described above and shown in FIGS. 7 and 8, with the incident beam from the laser 60 and the reflected beam from the mirror 64 passing through a clearance hole 182, FIG. 14, which is aligned with the aperture 174 when the fixture 170 is secured to the mounting pads 134, as shown in FIG. 15.

Figure 15A:
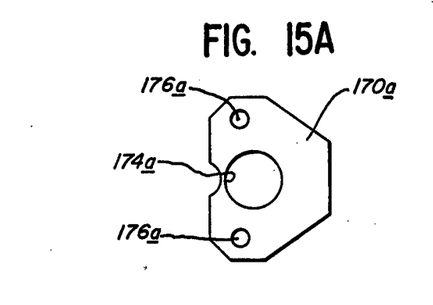
FIG. 15A is an elevational view of a fixture which may be used in place of the fixture shown in FIG. 15.

Referring to FIG. 15A, there is illustrated a further fixture 170a which may be utilized in place of the fixture 170, shown in FIG. 15. The primary difference between the fixture 170a and the fixture 170 is that the fixture 170a has only two mounting holes, 176a, which are used to secure the fixture 170a to the transducer mounting pads 134, 136.

The fixture 170a also includes an aperture 174a similar to the aperture 174 disclosed with respect to the fixture 170.

The fixture 170a is utilized in the same manner as the fixture 170, with the differences as noted above.

Referring now to FIGS. 17-20, there is shown one of the main gears, for example, the left main gear 36, in detail. The left main gear 36 will be fully described, it being understood that the right main gear 38 is identical thereto.

The left main gear 36 includes a bogie beam 200 which is carried by a shock strut, schematically shown at 202. Carried by the bogie beam 200 are wheel axles 204, 206 which, in turn, mount the wheels of the main gear.

Disposed on each end of the bogie beam 200 is a weight transducer unit 208, 210 which senses the loading on the bogie beam 200. Since the units 208, 210 are identical, a detailed description will only be made with reference to unit 208.

The weight transducer unit 208 is mounted on the end of the bogie beam 200 by a bolt and nut 212, 214 which pass through a hole located in a Tow Lug 216 of the bogie beam 200.

The transducer unit 208 includes a housing 218 within which is located a pair of transducers 220 similar to the transducer pairs 42, 44, described above. The transducer pair 220 are mounted within the housing 218 on transducer mounting pads 222 by bolts 224, similar to the mounting of the transducer pairs 42, 44 within the centerline gear axle housing 40.

Figures 17, 18, 19, 20:
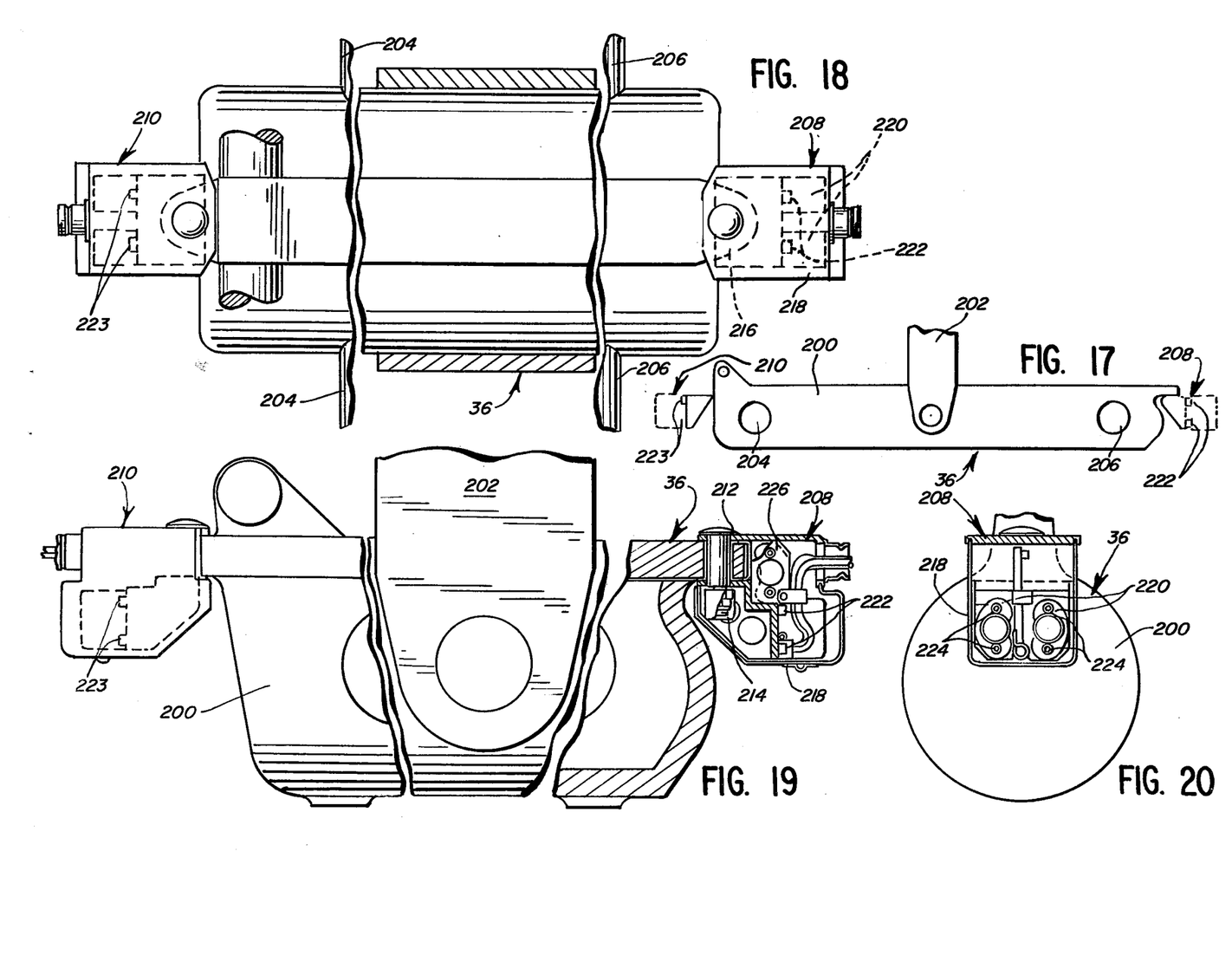
FIG. 17 is a schematic elevational view of a portion of a main landing gear bogie beam for the aircraft shown in FIG. 1.
FIG. 18 is a broken plan view, partially in section, of the bogie beam of the main landing gear shown in FIG. 17.
FIG. 19 is a broken elevational view, partly in section, of the bogie beam shown in FIG. 17.
FIG. 20 is an end view, partially in section, of the bogie beam shown in FIG. 17.

A further transducer 226, shown in FIG. 19, is mounted within the housing 218 with its sensitive axis perpendicular to the sensitive axis of the transducer pair 220 to sense lateral inclinations of the bogie beam 200. The transducer 226 is not involved in the alignment process and hence will not be described further.

Referring also to FIGS. 21-25, the main gear bogie beam does not have line-of-sight accessibility through the beam from one end to the other. It is, therefore, necessary to transpose the transducer mounting pads 222 and the corresponding pads 223 on the other end of the bogie beam 200 outside and below the bogie beam so a line-of-sight can be established. The apparatus for determining the degree of parallelism of the mounting pads 222, 223, therefore, includes an elongate C-shaped fixture 230 having first and second parallel faces 232, 234 which are ground flat to the same degree of accuracy as the ground faces 80 and 180 described above. Four mounting holes 236 are used to mount the fixtures 230 to the mounting pads, such as the mounting pads 223, shown in FIGS. 21-23, by means of screws 238.

Figure 21:
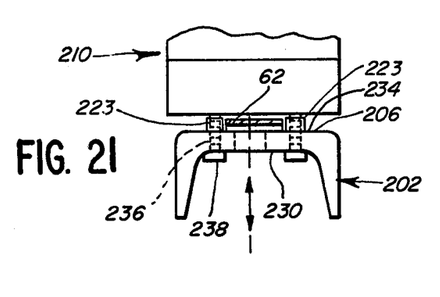
FIG. 21 is a plan view of a portion of a weight transducer adapter mount for a bogie beam with a fixture attached thereto.
Figure 22:
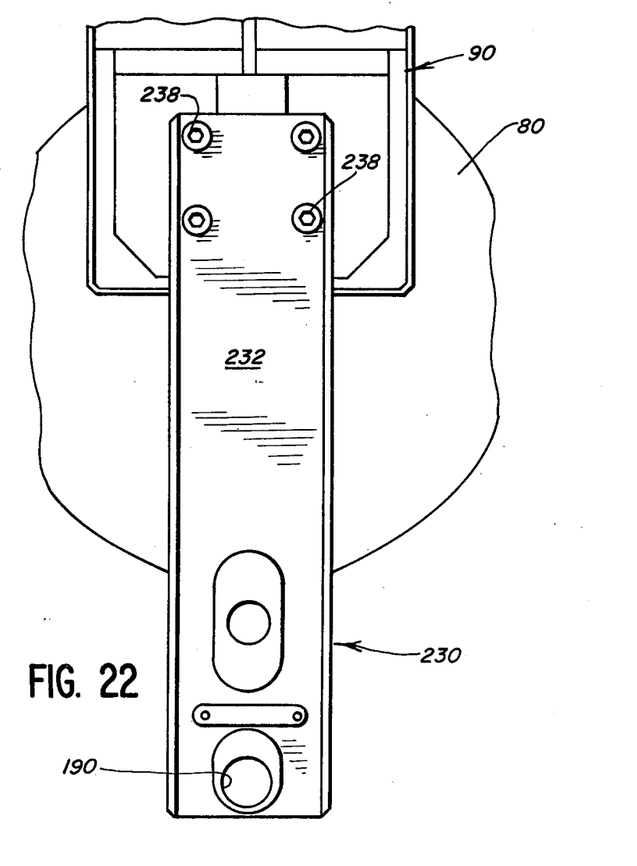
FIG. 22 is an elevational view, partly in schematic, of the weight transducer adapter mount in conjunction with a fixture.
Figure 23:
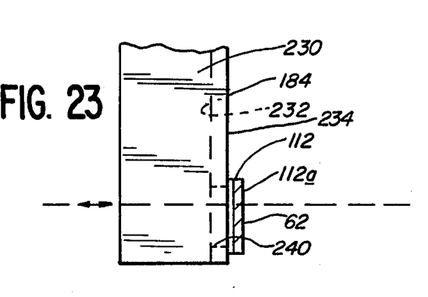
FIG. 23 is a side view, partially in phantom, of the fixture shown in FIG. 22.

The fixture 230 includes at its lower end an aperture 240 over which is mounted one of the mirrors, such as the mirror 62 shown in FIGS. 21 and 23.

Figure 24:
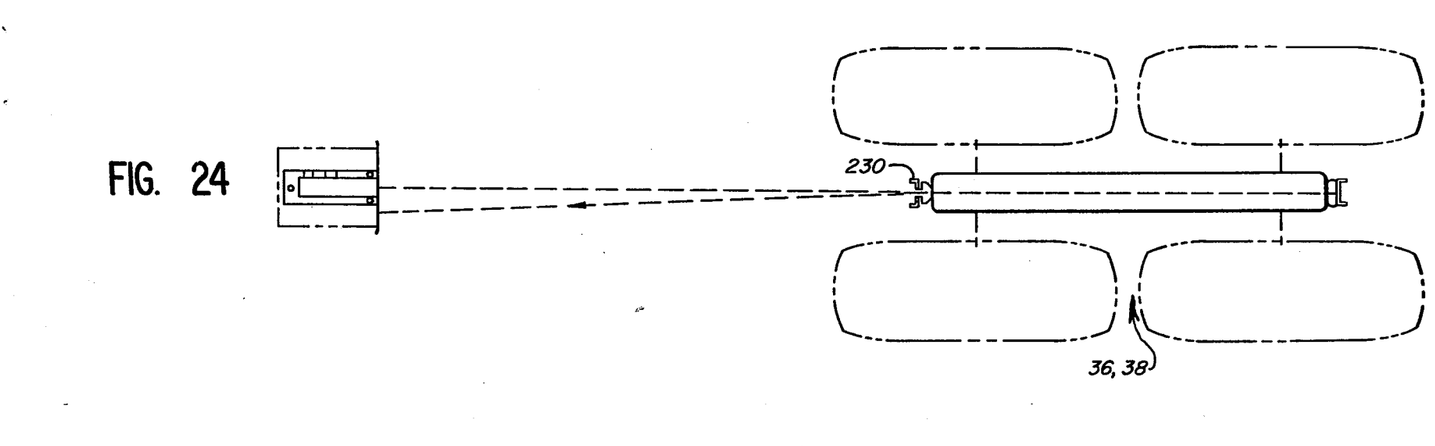
FIGS. 24 and 25 are views, similar to FIGS. 7 and 8, of the apparatus for measuring the alignment of transducer mounting surfaces of a main landing gear.
Figure 25:
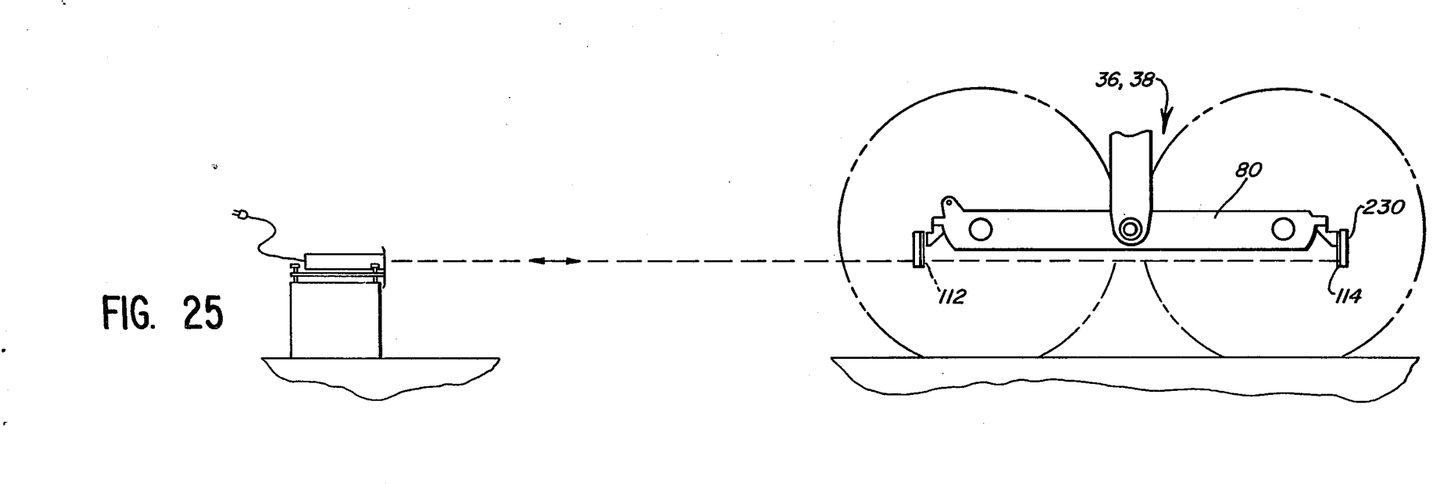

Referring to FIGS. 24 and 25, the measurement of alignment of the transducer mounting pads 222, 223 for the main gear 36, 38 is accomplished substantially as noted above with one major distinction. Once the position of the reflected beam R2 is adjusted to be directly above or below the incident beam, the following steps should be performed.

The bolt and nut of the weight transducer unit 210, corresponding to the bolt 212 and nut 214 of the weight transducer unit 208, FIG. 18, is loosened so that the transducer unit 210 is free to rotate in the horizontal plane. The unit 210 is then rotated so that the reflected beam R1 is centered directly above or below the incident light source. The nut and bolt are then retightened to maintain the unit 210 in this position.

By performing these additional steps, alignment of the transducer pads 222 with the pads 223 in the horizontal plane is assured, thereby obviating the need to perform the calculation with respect to horizontal alignment.

I claim:

1. A method of determining the degree of parallelism of a first transducer mounting surface relative to a second transducer mounting surface disposed at a distance from the first transducer mounting surface by utilizing a laser developing a laser beam and having a screen disposed on the front thereof having an aperture through which the laser beam passes, and a first and second fixture each having a substantially flat mounting face, an aperture extending through the fixture from the flat mounting face and an optically flat mirror having a face and carried by the fixture and extending over the aperture, the mirror of the first fixture being partly light-transmissive to allow a portion of an incident laser beam to pass therethrough, the method comprising:

securing the first and second fixtures to the first and second transducer mounting surfaces, respectively, with the flat mounting faces contacting the mounting surfaces;

directing the incident laser beam toward the mirrors so that the incident laser beam is reflected by the mirrors of the first and second fixtures to form first and second reflected beams, respectively, which are projected upon a front face of the screen;

positioning the laser and screen so that one of the reflected beams is projected on a vertical line extending through the incident beam;

measuring a quantity $b_H$ equal to the horizontal distance on the screen of the other reflected beam from the vertical line;

measuring a quantity B equal to the distance between the front face of the screen and the face of the closer of the two mirrors; and determining the angular error between the first and second transducer mounting surfaces by solving the equation $$\text{Angular error} = \tfrac{1}{2} \text{ Arc Tan } bH/B.$$

2. The method of claim 1 wherein the step of directing the incident laser beam includes locating the laser so that the mirror of the first fixture is disposed between the laser and the mirror of the second fixture.

3. The method of claim 2, wherein the step of positioning the laser and screen includes the step of positioning the second reflected beam a predetermined vertical distance $a_v$ on the screen from the beam.

4. The method of claim 3, including the further steps of:

mesuring a quantity A equal to the distance between the front face of the screen and the face of the mirror of the second fixture;

measuring a quantity $b_v$ equal to the vertical distance on the screen of the first reflected beam from the incident beam; and determining the vertical angular error between the first and second transducer mounting surfaces by computing and combining a pair of terms (1) and (2), where $$(1) = \tfrac{1}{2} \text{ Arc Tan } \frac{a_v}{A}$$

$$(2) = \tfrac{1}{2} \text{ Arc Tan } \frac{b_v}{B}.$$

5. The method of claim 4 wherein the terms (1) and (2) are added when the first reflected beam is located on the screen below the second reflected beam, and wherein the term (2) is subtracted from the term (1) when the first reflected beam is located on the screen above the second reflected beam.

6. The method of claim 1 wherein each transducer mounting surface is comprised of a plurality of mounting pads, and wherein the step of securing the first and second fixtures includes securing the flat mounting face to the mounting pads by means of screws.

7. The method of claim 1 wherein the step of directing the incident laser beam includes the step of positioning the incident beam of the laser at approximately the same height as the center of the aperture of the fixtures.

8. A method of determining the alignment of a first transducer mounting surface relative to a second transducer mounting surface by means of alignment apparatus including a laser, a screen having a front face disposed in front of the laser and having an aperture through which the incident light beam from the laser passes, first and second fixtures each having an aperture therethrough, a substantially flat mounting face and first and second optically flat mirrors each having a face and secured to the mounting faces of the first and second fixtures, respectively, the first mirror being partly light-transmissive, wherein the method comprises:

securing the flat mounting faces of the first and second fixtures to the first and second transducer mounting surfaces, respectively;

positioning the laser so that the incident light beam thereof is at approximately the same height as the center of the apertures of the fixtures and so that the first fixture is disposed between the laser and the second fixture;

directing the incident light beam so that the incident light beam is reflected by the mirrors of the first and second fixtures, respectively, to form first and second reflected beams which are projected upon the front face of the screen;

repositioning the laser and screen so that the second reflected beam is projected on the screen directly above the incident beam;

measuring a quantity $b_H$ equal to the horizontal distance on the screen of the first reflected beam from the incident beam;

measuring a quantity B equal to the distance between the front face of the screen and the face of the first mirror; and determining the horizontal angular error between the first and second transducer mounting surfaces by solving the equation $$\text{Horizontal angular error} = \tfrac{1}{2} \text{ Arc Tan } bH/B.$$

9. The method of claim 8 wherein the step of repositioning the laser and screen includes the step of projecting the second reflected beam a predetermined distance $a_v$ above the incident beam on the screen, and wherein the method includes the further steps of:

measuring a quantity A equal to the distance between the front face of the screen and the face of the second mirror;

measuring a quantity $b_v$ equal to the vertical distance on the screen of the first reflected beam from the incident beam;

computing a first term equal to $$\tfrac{1}{2} \text{ Arc Tan } av/A;$$

computing a second term equal to $$\tfrac{1}{2} \text{ Arc Tan } bv/B; \text{ and}$$

determining the vertical angular error between the first and second transducer mounting surfaces by adding the first and second terms when the first reflected beam is below the second reflected beam on the screen, and by subtracting the second term from the first term when the first reflected beam is above the second reflected beam on the screen.

10. A method of determining the alignment of a first transducer mounting surface relative to a second transducer mounting surface by means of alignment apparatus including a laser, a screen having a front face disposed in front of the laser and having an aperture through which the incident light beam from the laser passes, first and second fixtures each having an aperture therethrough, a substantially flat mounting face, and first and second optically flat mirrors each having a face and secured to the mounting faces of the first and second fixtures, respectively, the first mirror being partly light transmissive, wherein the method comprises:

securing the flat mounting faces of the first and second fixtures to the first and second transducer mounting surfaces, respectively;

positioning the laser so that the incident light beam thereof is at the same height as the center of the apertures of the fixtures and so that the first fixture is disposed between the laser and the second fixture;

directing the incident light beam so that the incident light beam is reflected by the mirrors of the first and second fixtures to form first and second reflected beams, respectively, which are projected upon the front face of the screen;

repositioning the laser and screen so that the second reflected beam is projected on the screen a predetermined distance $a_v$ directly above the incident beam;

measuring a quantity B equal to the distance between the front face of the screen and the face of the first mirror;

measuring a quantity A equal to the distance between the front face of the screen and the face of the second mirror;

measuring a quantity $b_v$ equal to the vertical distance on the screen of the first reflected beam from the incident beam;

computing a first term equal to $$\tfrac{1}{2} \text{Arc Tan } a_v/A;$$

computing a second term equal to $$\tfrac{1}{2} \text{Arc Tan } b_v/B; \text{ and}$$

determining the vertical angular error between the first and second transducer mounting surfaces by adding the first and second terms when the first reflected beam is below the second reflected beam on the screen, and by subtracting the second term from the first term when the first reflected beam is above the second reflected beam on the screen.

* * * * *